(12) United States Patent
Teed

(10) Patent No.: US 6,907,670 B1
(45) Date of Patent: Jun. 21, 2005

(54) FARRIER MEASUREMENT INSTRUMENT

(76) Inventor: Gail A. Teed, Rt. 1 Box 82A, Walker, WV (US) 26180

( * ) Notice: Subject to any disclaimer, the term of this patent is extended or adjusted under 35 U.S.C. 154(b) by 0 days.

(21) Appl. No.: 10/827,467

(22) Filed: Apr. 19, 2004

(51) Int. Cl.[7] ................................................ A01L 11/00
(52) U.S. Cl. .............................. 33/195; 33/511; 168/45
(58) Field of Search ........................... 33/195, 511, 427, 33/452, 464, 474, 476, 481, 483, 494; 168/45

(56) References Cited

U.S. PATENT DOCUMENTS

| | | | |
|---|---|---|---|
| 82,214 A | | 9/1868 | Ferren |
| 115,761 A | | 6/1871 | McNichol |
| 373,886 A | | 11/1887 | Delander |
| 442,020 A | * | 12/1890 | Darling ........................ 33/483 |
| 451,552 A | | 5/1891 | Damer |
| 546,287 A | | 9/1895 | Adler |
| 583,706 A | | 6/1897 | Kearns et al. |
| 791,469 A | | 6/1905 | Hunt |
| 802,448 A | | 10/1905 | Goodbar |
| 832,060 A | | 10/1906 | Holmquist |
| 1,221,557 A | | 4/1917 | Madden |
| 1,286,586 A | | 12/1918 | Gibbs |
| 1,497,492 A | * | 6/1924 | Engel ........................... 33/494 |
| 1,582,636 A | | 4/1926 | Clarke |
| 1,602,490 A | * | 10/1926 | Homan ......................... 33/494 |
| 1,684,555 A | | 9/1928 | Ritholz |
| 1,725,788 A | | 8/1929 | Foard |
| 2,114,385 A | | 4/1938 | Johnson |
| 2,486,748 A | * | 11/1949 | Koenig ......................... 33/494 |
| 2,593,385 A | | 4/1952 | Digate |
| 3,635,396 A | * | 1/1972 | Palfi ............................. 33/464 |
| 4,214,370 A | * | 7/1980 | Beaston ....................... 33/195 |
| 4,227,311 A | * | 10/1980 | Behney ........................ 33/195 |
| 4,813,148 A | | 3/1989 | Finnegan |
| 5,027,520 A | | 7/1991 | Finnegan |
| 5,822,223 A | | 10/1998 | Genest |
| 6,360,824 B1 | * | 3/2002 | Singley ........................ 33/195 |
| 6,502,642 B2 | * | 1/2003 | Ahrens ......................... 33/195 |
| 6,647,635 B1 | * | 11/2003 | Banfield ....................... 33/511 |

* cited by examiner

Primary Examiner—Christopher W. Fulton
(74) Attorney, Agent, or Firm—Bowles Rice McDavid Graff & Love LLP; John J. Giblin, Jr.; Anthony P. Tokarz

(57) ABSTRACT

A farrier's measurement instrument is disclosed to use in locating the preferred position for affixing a shoe to the bottom of a horse's hoof. The invention is comprised of a base of a rectilinear shape with a lower surface, a flange disposed orthogonally to the base at one end of the base, such that a long edge of the flange is aligned with the lower surface of the base, a slot disposed centrally and longitudinally within the base, wherein the slot extends to the edge of the base opposite the flange, a sliding rule which can slide longitudinally within the slot and has a lower surface coplanar with the lower surface of the base forming a planar lower surface of the farrier's measurement instrument, and a first and a second measurement scales disposed on the lower surface of the farrier's measurement instrument. The increment of the graduations of the second measurement scale is either directly or inversely three times proportional to those of the first measurement scale. The first measurement scale may be graduated in SAE or metric units.

16 Claims, 3 Drawing Sheets

FARRIER MEASUREMENT INSTRUMENT

BACKGROUND OF THE INVENTION

1. Field of the Invention

The invention disclosed herein relates to an instrument used in the farrier's trade for performing necessary measurements on the hoof of a horse.

2. Description of the Related Art

The traditional art of the farrier involves affixing iron shoes to the underside or sole of the hoof of a horse. The placement of the shoe on the hoof is crucial for proper balance, safety and health of the horse. The correct placement is determined by the proportions and geometry of the hoof.

Ideally, the shoe is positioned on the hoof by first identifying the frog of the hoof, which is the v-shaped cleft extending from the heel of the hoof towards the toe, ending at a point approximately midway from heel to toe. The preferred point for mounting the horseshoe is found, first by measuring the longitudinal length of the frog, then measuring to a point one-third of that distance from the apex towards the toe. The point is the preferred location for securing the shoe.

Typically, an experienced farrier may accurately determine the preferred mounting point by visual estimation. Otherwise, a less skilled farrier must measure the length of the frog with a ruler, mentally divide that measurement by 3, then reposition the ruler and measure that calculated distance from the apex of the frog towards the toe, all the while trying to hold and steady both the ruler and the foot of a potentially uncooperative horse. A typical SAE ruler is graduated in ⅛ or 1/16 inch increments, making quick division by 3 difficult. Likewise, a metric ruler is usually graduated in multiples of 10, which is likewise difficult to mentally divide by 3.

SUMMARY OF THE INVENTION

The invention disclosed is a farrier's measurement instrument for easily measuring the length of the frog of a horse's hoof and automatically calculating one-third of that distance. The instrument can then be repositioned to quickly find the calculated distance and assist in marking the proper position for securing the shoe to the hoof.

The farrier's measurement device is comprised of a base which is held against the bottom of a horse's hoof. An extended flange is provided at one end of the base, which is held firmly against the heel of the hoof. A groove is formed along the central longitudinal axis of the base. The groove extends from the end opposite from the flange, and terminates as near to the flange as practical while still providing sufficient structural rigidity. Within the groove is disposed a sliding rule. The sliding rule can slide along the groove and extend beyond the end of the base. The sliding rule has a slot formed along most of its length, allowing visual inspection of the hoof through the slot.

Disposed on the lower surface of the base along one or both longitudinal edges of the groove is a base measurement scale. The base scale or scales are indexed from the end of the base adjacent to the flange. If two scales were provided, one would typically be in SAE units, while the other would be in metric units. Opposed to these scales are corresponding scales that are proportional to one-third of the base scale. With these scales, a farrier can instantly measure the distance from the heel to the tip of the frog on the bottom of the hoof, without removing the instrument from the hoof, by reading across from an index line to a scale on the base. The farrier can also instantly find the calculated one-third of this distance above the apex by locating the same value from the base scale on the corresponding proportional scale. Since the proportional scale is graduated in proportion to one-third the base scale, no calculation by the farrier is necessary. The farrier places a mark on the hoof through the slot for the preferred position for mounting the shoe. The measurement instrument is then removed and the shoe can quickly be installed.

DETAILED DESCRIPTION OF THE INVENTION

Figure 1:
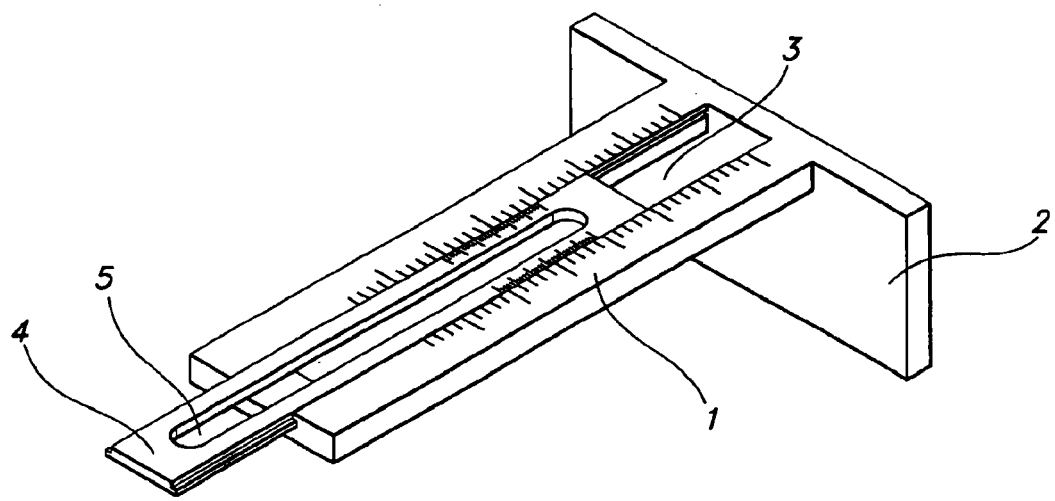
FIG. 1 is a perspective isometric drawing of the farrier's measurement instrument.

The farrier's measurement instrument is comprised of, firstly, a base 1. The base 1 is generally rectilinear in shape and of uniform thickness. It may be made of commonly available rigid materials, such as metal, plastic or wood. Suitable plastics may include polyester, polyimide, polypropylene or high density polypropylene. The base 1 has an upper and a lower surface.

At one end of the base 1, a flange 2 is disposed normal to the base 1. The flange 2 would typically be fabricated of the same material as the base 1. The edge of the flange 2 in communication with the base 1 is disposed flush with the lower surface of the base 1. The flange 2 may be integral to the base 1, or attached using commonly known means, such as adhesives or fasteners, appropriate for the material of construction. The flange 2 also is preferably rectilinear in shape, with its long axis coplanar with the surface of the base 1. The width of the flange 2 should preferably be slightly greater than the typical width of a horse's hoof, generally about 4 inches.

A groove 3 is disposed along the center longitudinal axis of the base 1, and extends from the interior face of the flange 2 through to the opposite end of the base 1. Disposed within the groove 3 is a sliding rule 4. The sliding rule 4 is rectilinear and has overall dimensions equal to the dimensions of the groove 3, and will preferably have a thickness equal to that of the base 1. The longitudinal sides of the sliding rule 4 and of the groove 3 may be shaped to interlock the sliding rule 4 within the groove 3 while still permitting longitudinal movement of the sliding rule 4. Such shapes for interlocking the two elements may include tongue-and-groove 3 joints or dovetail joints.

One or two graduated base scales 6 are disposed on the lower surface of the base 1, indexed at the edge adjacent to the flange 2, and traversing along the edge of the groove 3. The base scales 6 could be either in SAE or metric system units. If two base scales 6 are provided, as in the preferred embodiments, each base scale 6 would be either one of the unit systems.

A slot 5 or elongated opening is disposed along the center longitudinal axis of the sliding rule 4. The slot 5 extends as much of the length of the sliding rule 4 as practical, terminating a distance from each end of the sliding rule 4 sufficient to still provide structural strength and integrity for the sliding rule 4. The width of the slot 5 should be sufficient for the point of a marking instrument to pass, and preferably equal to one-half the width of the sliding rule 4.

Figure 3:
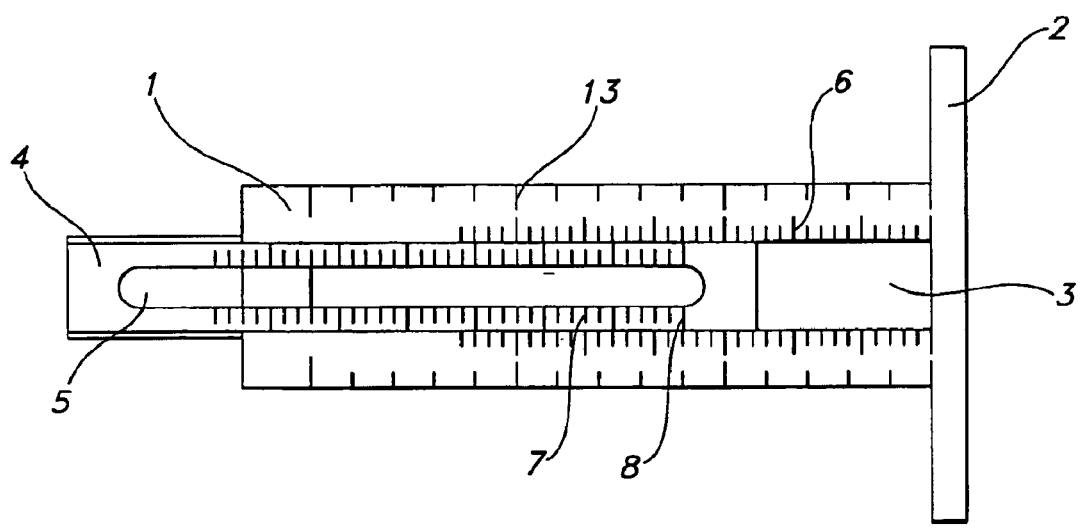
FIG. 3 is a plan view of a second embodiment of the invention

The invention is further comprised of one or two proportional scales. In the preferred embodiment, shown in FIG. 3, a conversion scale 13 is disposed along the outer edge of the base, laterally adjacent to the base scale 6. The graduations of the conversion scale 13 are spaced three times the distance between the graduations of the base scale 6. This provides a visual means for dividing a value on the base scale 6 by three; after a value is identified on the base scale 6, the value that is one-third the value on the base scale 6 is found directly adjacent to the conversion scale 13. If two base scales 6, one of SAE units and one of metric units, are present, the two correspondingly proportionate conversion scales are disposed on either exterior edge of the base 1, laterally adjacent to the corresponding base scale 6.

In this preferred embodiment, a rule scale 7 is disposed on the sliding rule 4, along its outer edge internally adjacent to the base scale 6 on the base 1. In this embodiment, the rule scale 7 is graduated equally with the base scale 6.

Figure 2:
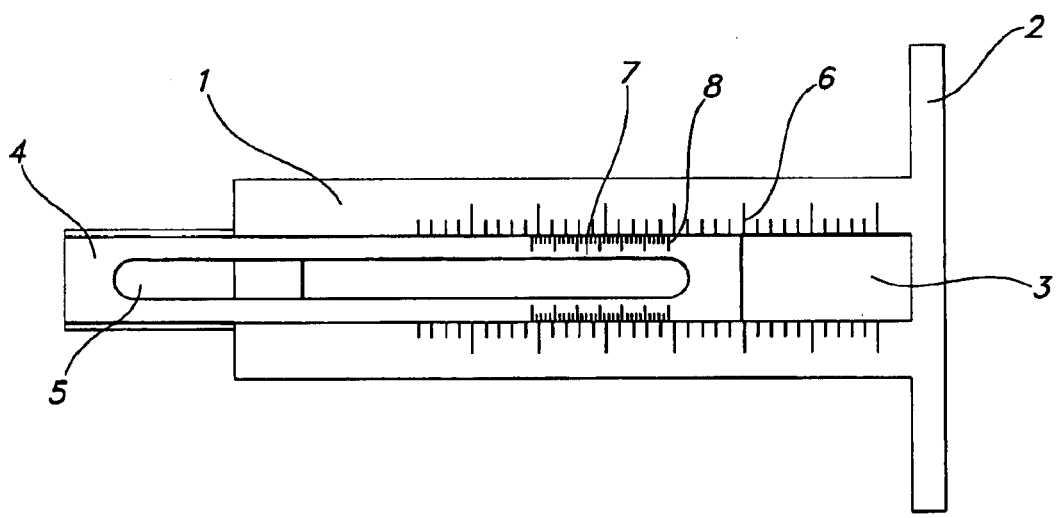
FIG. 2 is a plain view of the farrier's measurement instrument.

In an alternative embodiment of the invention, as shown in FIG. 2, there is, in addition to the base scale 6 along the interior edge of the base 1, a rule scale 7 disposed along the slide rule 4, preferably along the exterior edges. In this embodiment, the graduations of the rule scale 7 are compressed to one-third that of the base scale 6. No conversion scale is necessary in this embodiment. If two base scales 6 are used in different units of measure, then two rule scales 7 are disposed on either lateral side of the slide rule 4, preferably adjacent to the exterior edge, adjacent and one-third proportional to the corresponding base scale 6.

To use the farrier's measurement instrument, a farrier would normally position himself to the rear of a horse's leg, and cause the leg to bend at the knee joint, thereby elevating the hoof in the posterior direction and elevating the bottom of the hoof. When the sole of the hoof is at a comfortable working position, the farrier places the measurement instrument, with the sliding rule 4 fully retracted in its slot 5, against the sole of the hoof, such that the flange 2 abuts the heel 9 of the hoof and the upper surface of the base 1 rests against the sole. The slot 5 in the sliding rule 4 should be centered along the axis of the hoof. In this position, the centerline of the frog 10, including the apex of the frog 11, is visible through the sliding rule 4 slots 5 and the upper surface of the base 1 rests against the sole. The slot 5 in the sliding rule 4 should be centered along the axis of the hoof. The sliding rule 4 is moved longitudinally along the slot 5 such that the index mark 8 is aligned with the apex of the frog 11.

Figure 4:
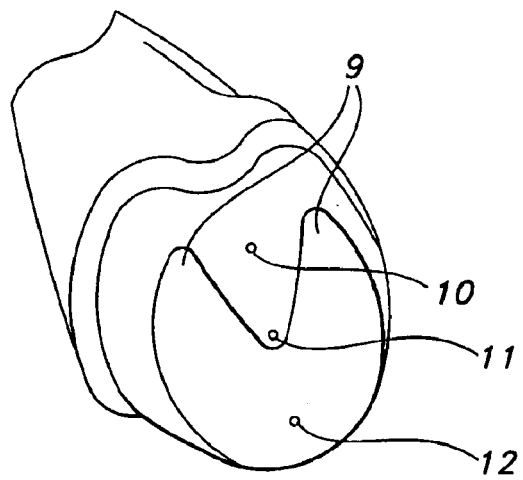
FIG. 4 is a diagram of the sole of the horse's hoof.
Figure 6:
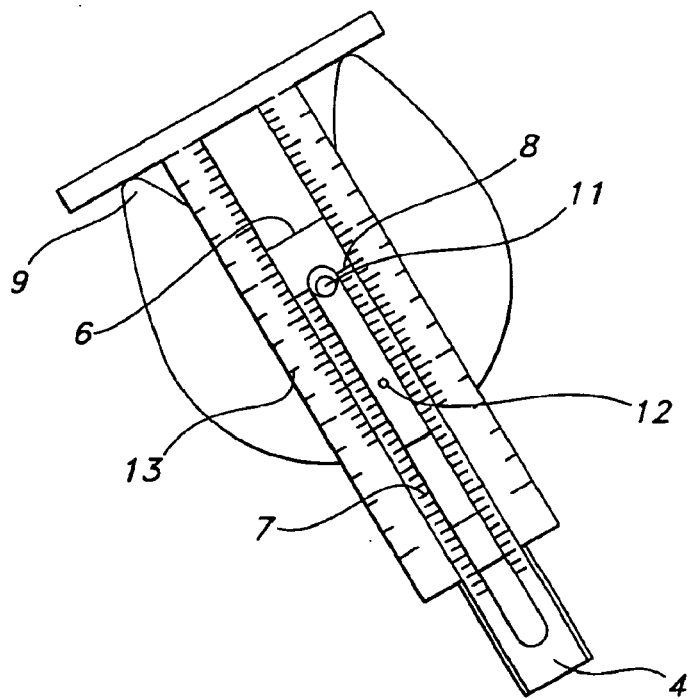
FIG. 6 shows the second embodiment of the farrier's measurement instrument in use to determine the preferred mounting point for a horseshoe.

Referring to FIG. 4, the preferred mounting point 12 for securing the horseshoe is found by aligning the index mark 8 on the sliding rule 4 with the apex of the frog 11. The length of the frog 10 is noted on the scale 6 on the base 1 adjacent to the index mark 8. To determine the location of the preferred mounting point 12 using the preferred embodiment of the invention, as shown in FIG. 6. The length from the heel 9 to the apex 11 of the frog 10, as noted on the base scale 6 laterally adjacent to the index mark 8, is divided by the three continuing to read laterally across the base 1 from the index mark 8 onto the conversion scale 13. This provides the desired distance to the mounting point 12 from the apex 11 a value that is one-third the actual length from the heel 9 to the apex 11 of the frog 10. To find the location of the desired mounting point 12, the same distance as the value provides from the conversion scale 13 is read along the rule scale 7, with the index mark 8 aligned with the apex 11 of the frog 10. A mark is made at this distance on the hoof through the slot 5, the invention is removed, and the shoe is attached at the desired mounting point 12.

Figure 5:
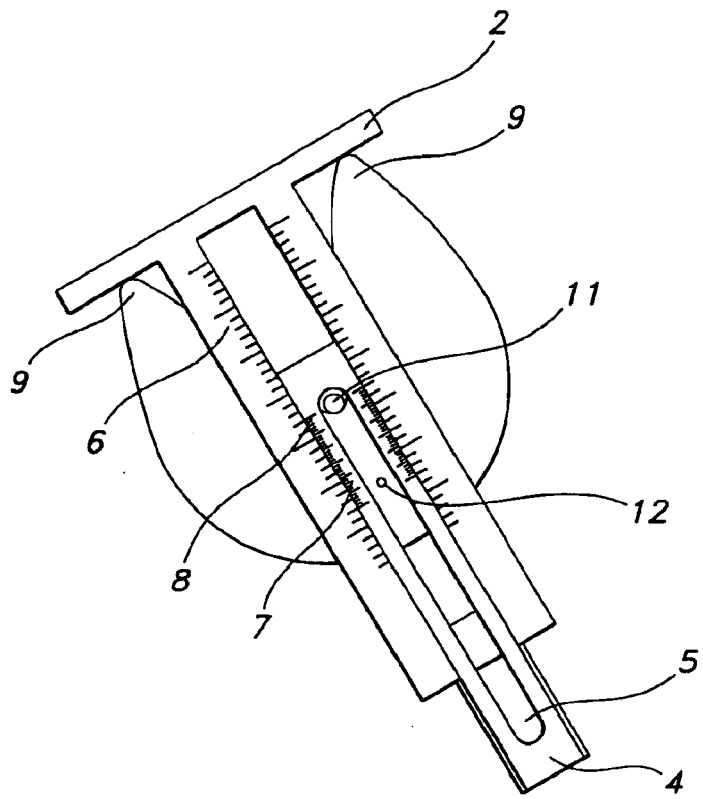
FIG. 5 shows the farrier's measurement instrument in use to determine the preferred mounting point for a horseshoe.

In the alternative embodiment of the invention, the desired mounting point is found, as illustration in FIG. 5, by likewise positioning the flange 2 of the invention against the heel 9 of the horse's hoof, and then aligning the index mark 8 on the slide rule 4 with the apex 11 of the frog 10. The distance to the desired mounting point 12 is found by first noting the value on the base scale 6 laterally adjacent to the index mark 8, which represents the distance from the heel 9 to the apex 11 of the frog 10, then identifying the same value on the rule scale 7. A mark is place on the hoof through the slot 5 adjacent to this identified value on the rule scale 7. Since the rule scale 7 in this alternative embodiment is graduated at intervals one-third the spacing of the intervals of the base scale 6, the identified value inherently represents one-third the length of the frog 10 without having to explicitly calculate or identify the value of that distance.

While various embodiments of the present invention have been described above, it should be understood that they have been presented by way of example, and not of limitation. It will be apparent to persons skilled in the relevant art that various changes in form and detail may be made therein without departing from the spirit and scope of the invention. This is especially true in light of technology and terms within the relevant art that may be later developed. Thus, the present invention should not be by any of the above-described exemplary embodiments, but should only be defined in accordance with the associated claims and their equivalents.

I claim:

1. A farrier's measurement instrument for measuring a horse's hoof and locating the preferred location for attachment of a shoe on said hoof, comprising
   a. A base, having an upper and lower surface;
   b. A flange rigidly attached at one end of and normal to the base, said flange having a lower edge disposed flush with the lower surface of the base;
   c. A groove disposed longitudinally in the base, said groove extending to the end of the base opposite the flange;
   d. A sliding rule disposed within the groove of the base, capable of sliding longitudinally along the groove of the base, and having a lower surface coplanar with the lower surface of the base;
   e. A slot within the sliding rule, said slot extending through the thickness of the sliding rule;
   f. A first linear measurement scale marked along the lower surface of the base;
   g. A second linear measurement scale marked along the surface of the sliding rule which is coplanar with the lower surface of the base, wherein said second linear measurement scale is graduated at increments one-third the length of the graduations of the first linear measurement scale.

2. The farrier's measurement instrument of claim 1, wherein the graduations of the first linear measurement scale on the base are disposed along the edge of the groove and the graduations of the second linear scale on the sliding rule are disposed along the edge of the slot.

3. The farrier's measurement instrument of claim 1, wherein the first linear measurement scale has graduations in SAE units.

4. The farrier's measurement instrument of claim 1, wherein the first linear measurement scale has graduations in metric units.

5. The farrier's measurement instrument of claim 1, further comprising:
   a. A third linear measurement scale disposed along the lower surface of the base, along the outer longitudinal edge laterally opposite the edge of the first linear measurement scale; and
   b. A fourth linear measurement scale disposed along the lower surface of the sliding rule, along the outer edge of the sliding rule laterally adjacent to the third measurement scale, wherein the fourth linear measurement scale is graduated at one-third that of the third measurement scale.

6. The farrier's measurement instrument of claim 5, wherein the graduations of the third linear measurement scale on the base are disposed along the edge of the groove and the graduations of the fourth linear scale on the sliding rule are disposed along the edge of the slot.

7. The farrier's measurement instrument of claim 5, wherein the first linear measurement scale has graduations in SAE units.

8. The farrier's measurement instrument of claim 5, wherein the first linear measurement scale has graduations in metric units.

9. A farrier's measurement instrument for measuring a horse's hoof and locating the preferred location for attachment of a shoe on said hoof, comprising
   a. A base, having an upper and lower surface;
   b. A flange rigidly attached at one end of and normal to the base, said flange having a lower edge disposed flush with the lower surface of the base;
   c. A groove disposed longitudinally in the base, said groove extending to the end of the base opposite the flange;
   d. A sliding rule disposed within the groove of the base, capable of sliding longitudinally along the groove of the base, and having a lower surface coplanar with the lower surface of the base;
   e. A slot within the sliding rule, said slot extending through the thickness of the sliding rule;
   f. A first linear measurement scale marked along the lower surface of the base;
   g. A second linear measurement scale marked along the lower surface of the base, wherein said second linear measurement scale is graduated at increments three times the length of the graduations of the first linear measurement scale; and
   h. A third linear measurement scale marked along the lower surface of the sliding rule, wherein said third linear measurement scale is graduated at increments equal to the length of graduations of the first linear measurement scale.

10. The farrier's measurement instrument of claim 9, wherein the graduations of the first measurement scale are disposed adjacent to the groove and the graduations of the second measurement scale are disposed adjacent to the outer edge of the base.

11. The farrier's measurement scale of claim 9, wherein the first and third measurement scales are graduated in SAE units.

12. The farrier's measurement scale of claim 9, wherein the first and third measurement scales are graduated in metric units.

13. The farrier's measurement scale of claim 9, further comprising a fourth measurement scale disposed on the lower surface of the base adjacent to the edge of the groove opposite from the first measurement scale, having units of measure different from the first measurement scale, and a fifth measurement scale disposed on the bottom surface of the base along the outer edge opposite the edge of the second measurement scale, wherein the fifth measurement scale is graduated at intervals three times the length of the fourth measurement scale, and a sixth measurement scale disposed along the bottom edge of the sliding rule along the edge opposite the third measurement scale, wherein said sixth measurement scale is graduated at intervals equal to the fourth measurement scale.

14. A farrier's measurement instrument for measuring a horse's hoof and locating the preferred location for attachment of a shoe on said hoof, comprising
   a. A base, having an upper and lower surface;
   b. A flange rigidly attached at one end of and normal to the base, said flange having a lower edge disposed flush with the lower surface of the base;
   c. A groove disposed longitudinally in the base, said groove extending to the end of the base opposite the flange;
   d. A sliding rule disposed within the groove of the base, capable of sliding longitudinally along the groove of the base, and having a lower surface coplanar with the lower surface of the base, said lower surfaces of the base and the sliding rule forming a planar lower surface of the farrier's measurement instrument;
   e. A slot within the sliding rule, said slot extending through the thickness of the sliding rule;
   f. A first linear measurement scale disposed on the lower surface of the base, and
   g. A second linear measurement scale disposed on the lower surface of the farrier's measurement instrument, wherein the length of the increments between graduations on the second linear measurement scale is directly or inversely three times proportional to the length of the increments between graduations on the first linear measurement scale.

15. The farrier's measurement instrument of claim 14, wherein the first linear measurement scale is graduated in SAE units.

16. The farrier's measurement instrument of claim 14, wherein the first linear measurement scale is graduated in metric units.

* * * * *